United States Patent
Gotwals (10) Patent No.: US 11,456,899 B2
(45) Date of Patent: *Sep. 27, 2022

(54) METHODS AND SYSTEMS FOR PERFORMING ANALYSIS AND CORRELATION OF DOCSIS 3.1 PRE-EQUALIZATION COEFFICIENTS

(71) Applicant: VIAVI SOLUTIONS INC., San Jose, CA (US)

(72) Inventor: Michael D. Gotwals, San Jose, CA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,182

(22) Filed: Mar. 22, 2021

(65) Prior Publication Data

US 2021/0351962 A1    Nov. 11, 2021

Related U.S. Application Data (63) Continuation of application No. 16/710,648, filed on Dec. 11, 2019, now Pat. No. 10,958,485.

(51) Int. Cl.
| | |
|---|---|
| H04L 25/03 | (2006.01) |
| H04L 5/00 | (2006.01) |
| H04L 27/26 | (2006.01) |
| H04L 5/02 | (2006.01) |
| H04B 3/46 | (2015.01) |

(52) U.S. Cl.
CPC ......... *H04L 25/03178* (2013.01); *H04B 3/46* (2013.01); *H04L 5/0007* (2013.01); *H04L 5/023* (2013.01); *H04L 27/265* (2013.01); *H04L 27/2628* (2013.01)

(58) Field of Classification Search
CPC ....... H04B 3/46; H04B 17/17; H04L 41/0677; H04L 41/0631; H04L 41/5009
See application file for complete search history.

(56) References Cited

U.S. PATENT DOCUMENTS

| | | | |
|---|---|---|---|
| 10,348,554 B2 | 7/2019 | Jin | |
| 10,367,699 B2 | 7/2019 | Jin | |
| 10,958,485 B1* | 3/2021 | Gotwals | ................ H04L 27/265 |
| 2004/0225505 A1* | 11/2004 | Andersen | ................ G10L 19/02 |
| | | | 704/500 |
| 2005/0111594 A1* | 5/2005 | Varyzgin | ............... H04L 7/0058 |
| | | | 375/344 |
| 2013/0003565 A1 | 1/2013 | Gotwals et al. | |
| 2014/0003478 A1* | 1/2014 | Liu | .......................... H04B 3/46 |
| | | | 375/224 |
| 2017/0155541 A1* | 6/2017 | Zhang | ....................... H04B 3/48 |
| 2017/0310539 A1* | 10/2017 | Jin | .......................... H04L 41/16 |

OTHER PUBLICATIONS

Larry Jump "Equalizers and their use in Preventative Network Maintenance", pp. 1-74, (May 28, 2015).

* cited by examiner

*Primary Examiner* — Sophia Vlahos (74) *Attorney, Agent, or Firm* — DLA Piper LLP (US)

(57) ABSTRACT

A method, apparatus and system for implementing pre-equalization equalizer tap analysis and correlation in a DOCSIS 3.1 network environment. The disclosed principles improve the pre-equalization analysis in the DOCSIS 3.1 environment by filtering out short distance reflections, which is required for the proper grouping and correlation of modems.

20 Claims, 4 Drawing Sheets

METHODS AND SYSTEMS FOR PERFORMING ANALYSIS AND CORRELATION OF DOCSIS 3.1 PRE-EQUALIZATION COEFFICIENTS

CROSS REFERENCE TO RELATED APPLICATION

This application is a continuation application to U.S. application Ser. No. 16/710,648; filed Dec. 11, 2019, the entire disclosure of which is incorporated by reference herein.

DETAILED DESCRIPTION OF SEVERAL EMBODIMENTS

Embodiments described herein may be configured to provide a method, apparatus and system for implementing pre-equalization equalizer tap analysis and correlation in a DOCSIS 3.1 network environment.

In one embodiment, a computer-implemented method comprises inputting, at a test instrument connected to a cable modem termination system (CMTS) of a network transmitting signals using orthogonal frequency division multiple access (OFDMA), pre-equalization tap data from a plurality of modems connected to the CMTS; determining peaks within the pre-equalization tap data; applying a mask to the determined peaks to create near field masked peak data; creating simulated equalizer tap data from the masked peak data; and using the simulated equalizer tap data in a process to isolate errors within the network.

Two-way hybrid fiber-coaxial (HFC) networks are shared bi-directional networks with point-to-multipoint transmission in the downstream direction, and multipoint-to-point transmission in the upstream direction. Signals are distributed via a fiber optic connection from a head-end to a node that converts the optical signal to an electrical signal, and then distributes the signals to residences via a tree and branch coaxial cable distribution network. At the subscriber side, terminal equipment supports the delivery of cable services (video, data and voice services) to subscribers, via cable modems. Data and voice services are supported by cable modems and communication gateways, respectively, which require the use of an upstream signal path. The network uses a fiber optic upstream signal path from the node to the head-end. A return band is used to support transmissions from devices at subscribers' premises back to the head-end. In such networks, many cable modems may compete for communication bandwidth in both the upstream and downstream directions.

A cable modem generally uses standardized communication protocol based on the Data over Cable System Interface Specification (DOCSIS) to access data services through the cable network, by using the downstream path to indicate exactly when each modem is permitted to transmit in the upstream direction. With the deployment of DOCSIS 3.1, field and maintenance technicians are faced with new challenges due to the use of technologies such as OFDM (Orthogonal Frequency Division Multiplexing) and modulation profiles that provide unprecedented flexibility and capability. Modulation is where OFDM makes significant improvements in network performance. Instead of using one modulation for the entire plant, OFDM can allow different modulations for each subcarrier. Profiles can be created that define what modulation is used on each subcarrier and multiple profiles can be created for this purpose.

Each sub-carrier may have its own modulation such as for example, 64 quadrature amplitude modulation (QAM), 1024 QAM, 2048 QAM, or 4096 QAM. OFDM can use the profile that has the highest QAM that a subcarrier can handle for each portion of the HFC plant. In one part of the plant, this might be e.g., 4096 QAM. In another part, it might be e.g., 1024 QAM.

Operators can use DOCSIS 3.1 to utilize portions of the plant that previously could not carry traditional quadrature amplitude modulation signals. Operators can also leverage DOCSIS 3.1 to gain additional capacity and efficiency to maximize their utilization of the existing plant. Knowing what to look for and how to evaluate DOCSIS 3.1 is critical for the field technician.

Pre-equalization (Pre-EQ) equalizers are located in the upstream transmitter of each DOCSIS 2 and higher cable modem. In the upstream, modems use pre-equalization to pre-distort carriers that cancel linear distortions caused by reflections in the network. In most scenarios, upstream pre-equalization completely compensates for certain problems in the network. As a result, no symptoms are detected at the CMTS (cable modem termination system), in forward error correction (FEC) statistics, or through other metrics. Pre-equalization equalizers compensate for network linear distortions and give an operator time to resolve issues before they impact quality of service.

Pre-equalization also enables proactive network maintenance. Operators can triangulate problems based on modem pre-equalization tap coefficients. If pre-equalization is enabled, it turns all cable modems into devices capable of doing upstream signal analysis.

The values used to set a modem's upstream transmitter pre-equalizer coefficients are derived from the initial post equalization of the CMTS receiver. When a modem is first turned on, it sends a ranging burst to the CMTS (the outer four symbols of the constellation). The CMTS adaptive equalizers (AE) look at this ranging burst and sends the pre-equalization coefficients back to the modem. The modem then loads these coefficients into its transmission pre-equalization equalizer in an attempt to achieve a "perfect" signal at the CMTS receiver. Ideally, the pre-equalization equalizer exactly corrects the linear distortions of the channel received at the CMTS from the modem. The inverse of the modem pre-equalizer response is the upstream response of the system. Upstream pre-equalization is a continuously monitored process by the CMTS, with updates made at the cable modem when needed as the system changes.

Using proactive network maintenance (PNM) to evaluate pre-equalization coefficients can determine the approximate distance from a reflection point to an impedance mismatch.

As with the adaptive equalizer, each tap of the pre-equalization equalizer represents a period of time. It must be understood that pre-equalization shows a distance between two reflection points, not a distance to the mismatch from the modem. This reflection point could be an amplifier port or another impedance mismatch.

Cable operators can no longer tolerate interruptions in service—customers can always choose new providers. HFC plants need to be completely reliable and require remote visibility into both cable plant and equipment operations. Adaptive equalizers in the CMTS and pre-equalization equalizers in the cable modems provide test points that enable characterization and aid troubleshooting of the HFC plant including remote and proactive troubleshooting. The goal is increased reliability, maximum throughput, and resolution of issues before they affect subscribers. One possible PNM includes determining the distances to reflection points, which are calculations based on modems with similar pre-equalization coefficients.

In DOCSIS 3.0 systems, the upstream consisted of a group of single QAM carriers. The CMTS and cable modem exchanged messages to determine what compensation needed to be applied to the transmitted signal to compensate for network impairments. This compensation is calculated for each upstream carrier and consisted of 24 coefficients (EQ taps). Eight coefficients represented the pre-main EQ taps that can be used to detect group delay. Conventionally, EQ tap 8 is the main tap that represents the main modem signal and EQ taps 9-24 represent the post main EQ taps that are used to compensate for micro-reflections.

Post-main EQ tap coefficients compensate for micro-reflections of various lengths. Using these coefficient levels, an assigned delay value and the velocity of propagation, the DOCS IS 3.0 system can calculate the distance of the echo cavity for micro-reflection impairments present on the upstream network. Due to the architecture of the cable network, the last segment of cable is dedicated to a single home. Typically, an RF tap will break out 1 to 4 connections for home connections. From the RF tap, a cable of about 50 to about 200 feet may be connected to the house and then the cable may be distributed throughout the house via series of splitters. The multiple connections in this segment can create short micro-reflections that result in taps 9 (86 feet) and 10 (172 feet) to be elevated.

The value of pre-equalization analysis comes from finding network impairments that are in the main truck that may be affecting many customers. This analysis may involve correlating modems that have a common coefficient signature and grouping those modems together. Further analysis to find the common network component that is serving the correlation group may locate the location of the impairment. With the location identified, a technician may be dispatched directly to the problem area. In order to improve the grouping procedure, it is necessary to mask off short reflections that occur from the RF tap to the house. In a DOCSIS 3.0 network, this may be accomplished by masking off EQ taps 9 and 10 before the grouping analysis is performed.

This solution, however, is not possible in a DOCSIS 3.1 system. For example in a DOCSIS 3.1 system, the upstream carrier modulation is OFDMA (orthogonal frequency-division multiple access), which is a multi-user version of the OFDM digital modulation scheme. The pre-equalizer has only one pre-equalization tap for each sub-carrier. With this configuration, the micro-reflection delay shows up as a ripple on the pre-equalization taps.

Using the frequency of the standing wave ripple and the sample rate of a fast Fourier transform (FFT) a time can be derived and a distance can be calculated from the time and velocity of propagation (VoP). The problem in a DOCSIS 3.1 system/network is that filtering out short distance reflections becomes more difficult than just the simple masking of pre-EQ taps as was done in SC-QAM (single-carrier quadrature amplitude modulation) based equalizers.

Accordingly, there is a need and desire to filter out short distance reflections in an OFDMA environment such as a DOCSIS 3.1 environment, which may be beneficial to correlate and group modems based on pre-equalization tap analysis.

In accordance with the disclosed principles, a system and method for implementing pre-equalization equalizer tap analysis and correlation in a DOCSIS 3.1 network environment is provided. The disclosed principles improve the pre-equalization analysis in the DOCSIS 3.1 environment by filtering out short distance reflections, which is required for the proper grouping and correlation of modems. In one or more embodiments, by filtering out the short distance reflections (i.e., standing waves), longer distance waves may be correlated across multiple cable modems. As can be appreciated, this may be an important factor for determining the proper grouping of modems that only have network issues and not in-home issues. That is, without filtering out the short in-home reflections, the grouping procedure would not be able to correlate modems properly in a DOCSIS 3.1 environment, which is undesirable.

Figure 1:
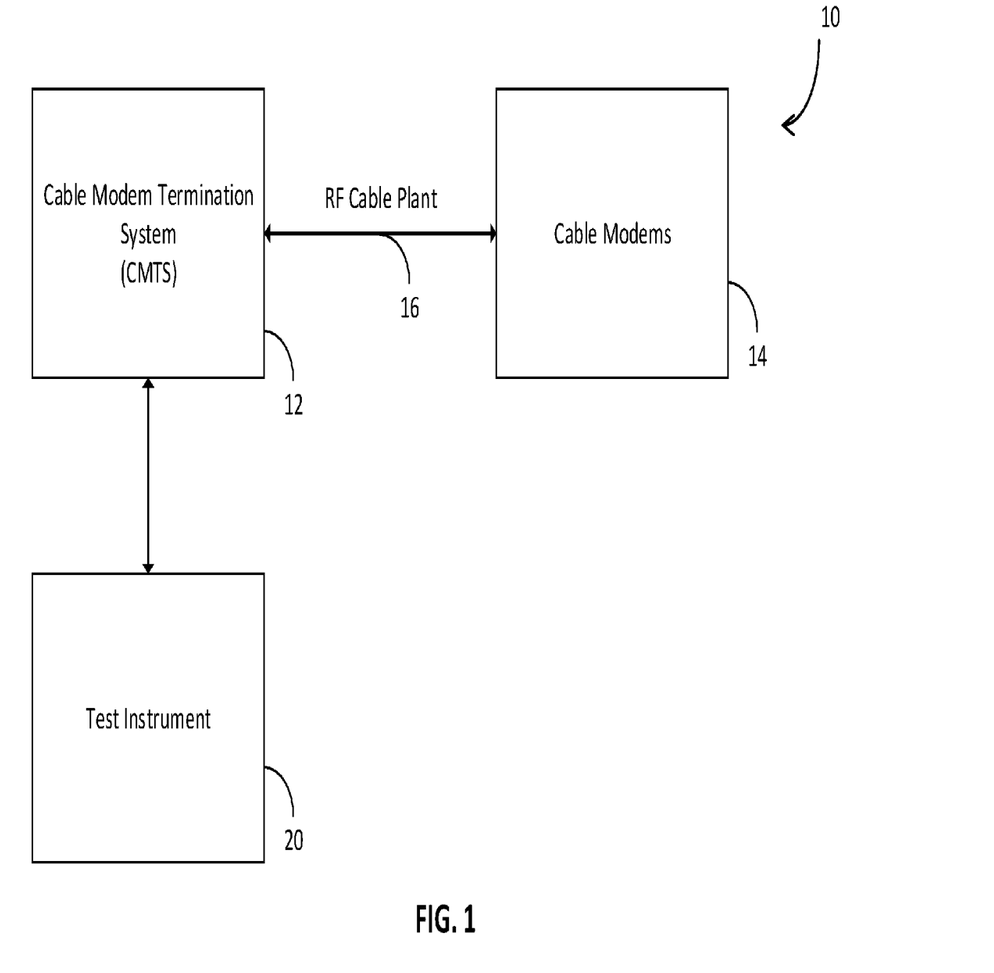
FIG. 1 shows an example of a system in accordance with the principles disclosed herein.

FIG. 1 illustrates a system 10, according to an example of the present disclosure. In this system 10, a test instrument 20 may be used to perform a pre-equalization equalizer tap analysis and correlation process (e.g., process 200 illustrated in FIG. 3) in accordance with the disclosed principles. In the illustrated example, the system 10 may be part of a cable TV network, but the test instrument 20 may be used in other types of networks.

Network 10 may be a portion of a cable TV network that delivers cable TV signals, including digital TV signals and data and control signals, to end users at customer premises in the downstream direction, and receives and forwards data and other signals from the customer premises in the upstream direction. The network 10 may include a hybrid fiber coaxial network or other type of cable TV network. The network 10 includes a cable modem termination system (CMTS) 12 connected to one or more cable modems 14 by an RF cable plant 16. In the illustrated embodiment, the test instrument 20 may be connected to the CMTS 12 and perform the operations discussed herein. It should be appreciated that the network 10 may include other equipment (e.g., amplifiers) and or connections and that the disclosed principles are not limited to the illustrated example.

The CMTS 12 may handle DOCSIS signals and an edge quadrature amplitude modulation (EQAM) for video signals and perform other functions known to be performed by headends in cable TV networks. Downstream radio frequency (RF) signals may be transmitted from the CMTS 12 and may be distributed to a plurality of end-of-the-line subscribers or end users. One or more of the cable modems 14 may be located at the customer premises, and downstream signals may be demodulated using the cable modems 14. As known in the art, the cable modems 14 may be connected to customer premises equipment (not shown), such as wireless routers, set top boxes, smart televisions, personal computers, smartphones, etc.

Upstream RF signals may be transmitted from the customer premises (via modems 14) towards the CMTS 12. The network 10 may serve a large number of customer premises, which may be connected by taps to a plurality of coaxial cables at a plurality of different locations.

The CMTS 12 may control and setup data paths in the network 10. The CMTS 12 may support the DOCSIS MAC protocol and upper layer DOCSIS protocols. The CMTS 12 may perform signaling functions, downstream and upstream bandwidth time slot scheduling, and DOCSIS framing. The CMTS 12 may provide video processing functions. In accordance with the disclosed principles, the CMTS 12 implements DOCSIS 3.1 functionality as is known in the art.

Figure 2:
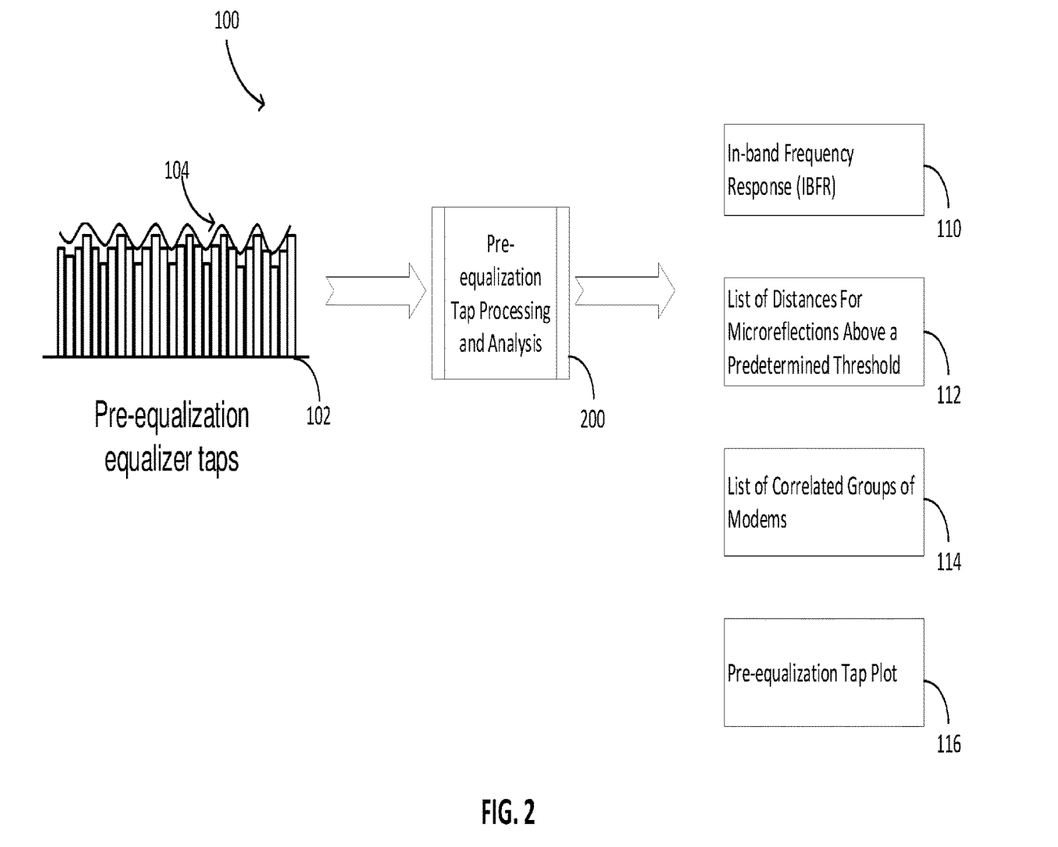
FIG. 2 shows a conceptual block diagram of a processing environment illustrating example inputs, outputs and processing performed in accordance with the principles disclosed herein.

FIG. 2 shows a conceptual block diagram of a processing environment 100 illustrating example inputs 102, outputs 110, 112, 114, 116 and processing 200 performed in accordance with the principles disclosed herein. In the illustrated example, the inputs 102 are 720 pre-equalization equalizer taps spanning the frequency range of 5.5 MHz to 41.5 MHz. In an optimal scenario, the average power of the pre-equalization equalizer taps would be 1.0 dB. In the illustrated example, micro-reflections 104 are present in one or more of the input signals. As discussed herein, the disclosed processing 200 may be used to process and analyze the inputs 102 to generate one or more of the outputs 110, 112, 114, 116. In the illustrated example, output 110 may be an in-band frequency response (IBFR), output 112 may be a list of distances for micro-reflections above a predetermined threshold, output 114 may be a list of correlated groups of modems, and output 116 may be a pre-EQ tap plot. It should be understood that the disclosed principles are not limited to any specific output and that any output suitable for pre-equalization tap analysis and or further proactive network maintenance based on this analysis may be used.

Figure 3:
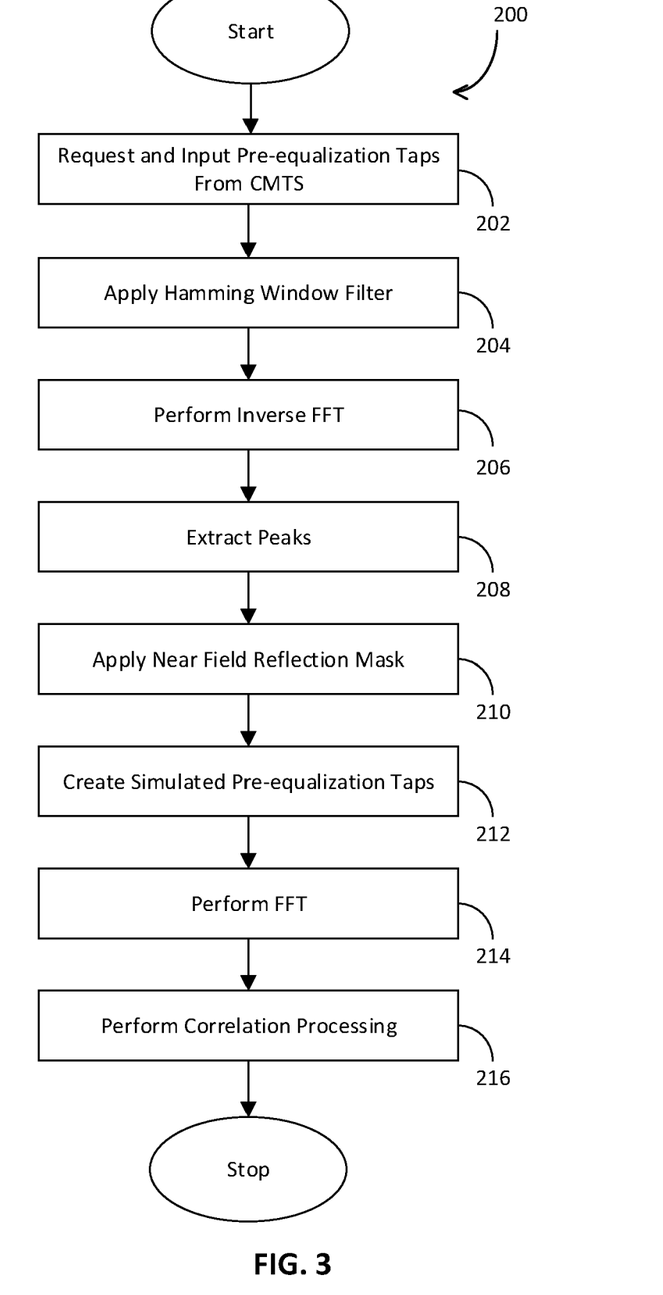
FIG. 3 shows an example pre-equalization equalizer tap analysis and correlation process in accordance with the principles disclosed herein.

FIG. 3 shows an example pre-equalization equalizer tap analysis and correlation process 200 in accordance with the principles disclosed herein. In one embodiment, the process 200 may be performed by a test instrument 20 such as e.g., a laptop, personal computer or other computing device, smart phone or tablet having access to or implementing the XPERTRak System sold by VIAVI Solutions Inc. In one embodiment, the process 200 may be performed as part of a "Proactive Network Maintenance (PNM) View" of the XPERTRak System or another analysis function of the test instrument 20. In one embodiment, the test instrument 20 is connected to the CMTS 12 by a wired or wireless network connection.

The process 200 begins at step 202 where the test instrument may request and input pre-equalization tap data from the CMTS 12. This step may be activated by a command from a dashboard or other menu associated with the process 200 or it may occur automatically when the process 200 is activated. The pre-equalization tap data (e.g., inputs 102) may be used as part of proactive network maintenance to correlate and group modems within the network 10 as disclosed herein. In one embodiment, the input data is an array of complex numbers (i.e., I and Q data), each complex number representing an equalization-tap value at an individual frequency. In one embodiment, the array length depends on the OFDMA channel configuration of the network 10.

At step 204, the test instrument may apply a Hamming window filter on the input pre-equalization tap data (e.g., treating the data as time domain data). As known in the art, a Hamming window filter may be used on the raw pre-EQ tap data to reduce the effects of any leakage that may occur by subsequent FFT and inverse FTT processing of the data. In one embodiment, the Hamming window filer w(n) may be the filter set out below in Equation (1), where n is the data point and M is the order of the filter:

$$w(n) = 0.54 - 0.46 \cos(2\pi n/M) \tag{1}$$

At step 206, the test instrument may perform an inverse FFT on the filtered data to change a domain of the filtered data. In one embodiment, the inverse FFT $h_k$ may be the function set out below in Equation (2), where k represents the filtered data points in the time domain, n represents the filtered data points in the frequency domain and N is the number of filtered points:

$$h_k = \frac{1}{N} \sum_{n=0}^{N-1} H_n e^{\frac{-2\pi i k n}{N}} \tag{2}$$

At this point in the process 200, at step 208, the test instrument 20 may look for and extract peaks in the data. In one embodiment, the test instrument 20 may look for data values that are greater than a predetermined threshold. In one or more embodiments, the threshold may be −40 dB. In one or more embodiments, the processing at step 208 may include choosing peaks above a predetermined threshold (e.g., −40 dB), determining a main tap (e.g., the tap with the largest peak), normalizing the data such that the main tap is at the zero distance point, and or removing harmonics from the data. The result of step 208 is data that may consist solely of one or more reflections that may consist solely of peaks and, in one embodiment, the largest peak (i.e., main tap) is at the zero distance point.

At step 210, the test instrument 20 may apply a near field reflection mask to remove short distance reflections from the processed data. The mask may be configured to mask out any data values below a predetermined level that is suitable for masking out short distance reflections. At this point in the process 200, the test instrument may have determined micro-reflection distances and their relative levels that are only attributable to CMTS to modem issues. That is, the removed short distance reflections are the reflections caused by the "cable drop" to the customers' premises and, as noted above, these reflections should not be used in the pre-equalization tap analysis and correlation as they are not part of the CMTS 12 to cable modem 14 impedance mismatch issues.

At step 212, the test instrument 20 may create simulated pre-equalization taps so that the remaining data is similar to the data from pre-DOCSIS 3.1 systems. In one or more embodiment, this step may involve removing unnecessary signals that may reduce the eventual correlation of signals. In one or more embodiments, this step may reduce the resolution and reduce the effects of small differences in peak positions. Thus, at this point in the process 200, the test instrument 20 may process the pre-equalization data in the conventional manner used in pre-DOCSIS 3.1 systems. Therefore, a unique feature of the disclosed embodiments is the transformation and reduction of the DOCSIS 3.1 single tap data so that modem correlation and grouping may be performed in the conventional manner.

At step 214, the test instrument 20 may perform an FFT to obtain an in-band frequency response (IBFR) (e.g., output 110). In one embodiment, the FFT $H_n$ may be the function set out below in Equation (3), where k represents the filtered data points in the time domain, n represents the filtered data points in the frequency domain and N is the number of filtered points:

$$H_n = \sum_{k=0}^{N-1} h_k e^{\frac{2\pi i k n}{N}} \tag{3}$$

In one or more embodiments, the in-band frequency response can be output to a display of the test instrument 20 so that it may be further analyzed by a technician. Moreover, a list of distances for the micro-reflections above the predetermined threshold (e.g., output 112) may be output to the display of the test instrument 20 if desired.

At step 216, the test instrument 20 may perform modem correlation and grouping processing. This processing may include converting the simulated taps to low resolution taps. For example, in one embodiment, this may involve reducing the number of simulated taps from 1024 to 48. In one embodiment, reducing the number of taps may be performed by batching the data into groups. The reduction in the number of taps may help grouping by removing micro-reflections at the bin seam. In one or more embodiments, the grouping may occur on the low resolutions taps. In one or more embodiments, a list of correlated groups of modems (e.g., output 114) may be output to the display of the test instrument 20. In addition, at any point in the process 200 the test instrument 20 may output a pre-EQ tap plot (e.g., output 116). Although not shown, the disclosed principles may also determine group delay for any correlated and grouped modems in accordance with the disclosed principles.

In one or more embodiments, the correlation and grouping processing 216 may be performed as follows. Initially, the test instrument 20 may calculate and save the correlation factor of each pair of modems (discussed below in more detail). The test instrument 20 may then sort the calculated correlation factors from best to worst (e.g., highest to lowest). The test instrument 20 may then reduce the list to include only those modem pairs that have a correlation factor greater than a predetermined minimum grouping correlation factor. The test instrument 20 may then start at the top of the list (e.g., the modem sets with the highest correlation factors) and may 1) determine If the modem set has not been grouped, then the test instrument 20 may create a new group; 2) determine if either modem has not been grouped, the test instrument 20 may add the ungrouped modem to the grouped modem's group; or 3) determine if both modems are grouped but not with each other, the test instrument 20 may move the modem from the higher group (e.g., the group that was created last and thus has lower correlation levels) to the lower group.

In one or more embodiments, the correlation factor of each pair of modems may be determined as follows. If the test instrument 20 determines that both responses do not have a maxima, then the correlation factor may be set to 0. If the test instrument 20 determines that either response has no maxima then the correlation factor is set to a minimum correlation factor. The test instrument 20 may add up the total power of peaks in A. For each A peak, the test instrument may find the matching B peak and calculate the total error vector magnitude. The test instrument 20 may count the matches and track which peaks match. In one or more embodiments, for each matched A, the test instrument may calculate the total diffY and add the diffY to the total error. For each matched B, the test instrument may calculate the total diffY and add the diffY to the total error. In one or more embodiments, the errorRatio is 10*log(total linear power in A/(10^(0.1*totalDeltaMag)).

Figure 4:
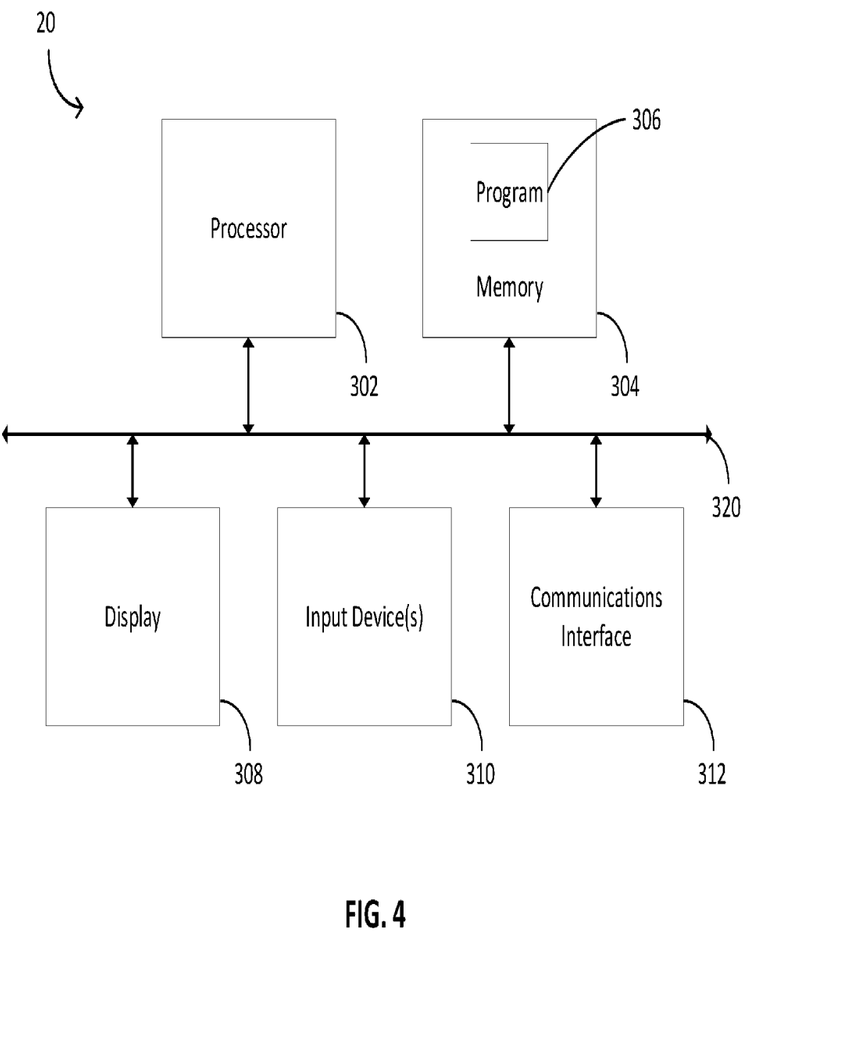
FIG. 4 shows an example test instrument that may be used to implement the pre-equalization equalizer tap analysis and correlation process in accordance with the disclosed principles.

FIG. 4 shows a high-level block diagram of the test instrument 20 according to an example embodiment. It should be appreciated that the test instrument 20 may include components other than those shown. In one embodiment, the test instrument 20 is a computing device such as a laptop, personal computer or other computing device, smart phone or tablet. In one embodiment, the test instrument 20 may include a processor 302, memory 304, display 308, one or more input devices 310 and a communications interface 312 connected to each other by one or more buses 320.

The processor 302 may include any suitable hardware to perform the operations of the test instrument 20 described herein, including the operations described with respect to FIG. 3 and the methods described herein. The hardware of the test instrument 20, including the processor 302, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein.

The memory 304 may store any data/information input, used and or output by the test instrument 20 and may Include a non-transitory computer readable medium storing one or more programs 306 comprised of machine-readable instructions executable by the processor 302 to perform operations of the test instrument 20 such as those described for process 200. The non-transitory computer readable medium, may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. In one or more embodiments, the program 306 may include the instructions for process 200 and or instructions for accessing or implementing an analysis program such as the XPERTRak System sold by VIAVI Solutions Inc.

The one or more input devices 310 may include a keypad, mouse and or other device allowing a user to input information into the test instrument 20. The display 308 may include a touch screen display, which would also allow a user to input information into the test instrument 20. A user may interact with the test instrument 20, such as to enter information, select operations, view measurements, view interference profiles, etc., via the input devices 310 and display 308. The communications interface 312 may include one or more ports for connecting the test instrument 20 to the CMTS 12.

In an example use of the test instrument 20, a technician wishing to perform proactive network maintenance may connect the test instrument 20 to the CMTS 12 via the communication interface 312. The technician may select a "Proactive Network Maintenance (PNM) View" function via the input device 310 to initiate the process 200 disclosed herein. The test instrument 20 may receive signals and data via the communication interface 312 and the processor 302 may perform the pre-equalization equalizer tap analysis and correlation process 200 in accordance with the disclosed principles. As can be appreciated, one or more of the inputs 102 or outputs 110, 112, 114, 116 may be presented on the display 308.

The apparatus, system and method disclosed herein may provide numerous advantages over the current state of the art. For example, the pre-equalization equalizer tap analysis and correlation process 200 disclosed herein provides an improved proactive network maintenance procedure designed for the complex DOCIS 3.1 system. In one or more embodiments, the disclosed process 200 may filter out short distance micro-reflections related to "cable drops" so that the longer distance reflections can be analyzed and correlated across multiple cable modems. This is important for the proper grouping of modems, which needs to be determined based on CMTS to cable modem issues. Without filtering out short in-home "cable drop" reflections, it would be difficult to properly group and correlate modems. In addition, the disclose process 200 allows for modem grouping to be performed in a convention manner even though the system in a DOCSIS 3.1 system.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method performed by a test device configured to be connected to a cable modem termination system (CMTS) of a network transmitting signals using orthogonal frequency division multiple access (OFDMA), said method comprising:
    inputting pre-equalization tap data from a plurality of modems connected to the CMTS;
    filtering out short distance reflections from the pre-equalization tap data to generate a filtered pre-equalization tap data; and
    performing a pre-equalization tap analysis process on the filtered pre-equalization tap data, the pre-equalization tap analysis process creating simulated pre-equalization tap data and using the simulated pre-equalization tap data to isolate errors within the network.

2. The method of claim 1, wherein filtering out the short distance reflections from the pre-equalization tap data comprises:
    determining peaks within the pre-equalization tap data; and
    applying a mask to the determined peaks masking off the short distance reflections to create masked peak data, wherein the simulated pre-equalization tap data is created from the masked peak data.

3. The method of claim 2, further comprising:
    prior to determining peaks within the pre-equalization tap data, filtering the pre-equalization tap data using a window filter; and
    performing an inverse fast Fourier transform (FFT) on the pre-equalization tap data, filtered using the window filter, to change a domain of the pre-equalization tap data filtered using the window filter.

4. The method of claim 1, further comprising performing a fast Fourier transform (FFT) on the simulated pre-equalization tap data to obtain an in-band frequency response (IBFR).

5. The method of claim 4, further comprising, prior to performing the FFT on the simulated pre-equalization tap data, applying a mask to the pre-equalization tap data to remove data associated with the short distance reflections from the pre-equalization tap data, the applying the mask being a part of the filtering out the short distance reflections.

6. The method of claim 1, wherein the pre-equalization tap data comprises a plurality of complex number values, each complex number value corresponding to a pre-equalization equalizer tap value at a respective frequency.

7. The method of claim 6, further comprising determining peaks within the pre-equalization tap data by:
    comparing the pre-equalization tap data to a predetermined threshold; and
    identifying a peak when the pre-equalization tap data exceeds the predetermined threshold.

8. The method of claim 6, further comprising determining peaks within the pre-equalization tap data by:
    comparing the pre-equalization tap data to a predetermined threshold;
    identifying a peak when the pre-equalization tap data exceeds the predetermined threshold;
    identifying a main tap as a the tap with a largest peak; and
    normalizing the data such that the main tap is at a zero distance.

9. The method of claim 8, further comprising removing harmonics from the pre-equalization tap data.

10. The method of claim 1, further comprising correlating and grouping the plurality of modems within the network.

11. A test device configured to be connected to a cable modem termination system (CMTS) of a network transmitting signals using orthogonal frequency division multiple access (OFDMA), said test device comprising:
    a storage device; and
    a processor executing program instructions stored in the storage device to:
        input pre-equalization tap data from a plurality of modems connected to the CMTS;
        filter out short distance reflections from the pre-equalization tap data to generate a filtered pre-equalization tap data; and
        perform a pre-equalization tap analysis process on the filtered pre-equalization tap data, the pre-equalization tap analysis process creating simulated pre-equalization tap data and using the simulated pre-equalization tap data to isolate errors within the network.

12. The test device of claim 11, wherein the filtering out of the short distance reflections from the pre-equalization tap data further comprises:
    determining peaks within the pre-equalization tap data; and
    applying a mask to the determined peaks masking off the short distance reflections to create masked peak data, wherein the simulated equalization tap data being created from the masked peak data.

13. The test device of claim 12, wherein the processor further performs:
    prior to determining peaks within the pre-equalization tap data, filtering the pre-equalization tap data using a window filter; and
    performing an inverse fast Fourier transform (FFT) on the pre-equalization tap data, filtered using the window filter, to change a domain of the filtered pre-equalization tap data filtered using the window filter.

14. The test device of claim 11, wherein the pre-equalization tap analysis process performed by the processor further comprises performing a fast Fourier transform (FFT) on the simulated pre-equalization tap data to obtain an in-band frequency response (IBFR).

15. The test device of claim 14, wherein prior to performing the FFT on the simulated pre-equalization tap data, the processor further performs applying a mask to the pre-equalization tap data to remove data associated with the short distance reflections from the pre-equalization tap data, wherein the applying the mask is a part of the filtering out short distance reflections.

16. The test device of claim 11, wherein the pre-equalization tap data comprises a plurality of complex number values, each complex number value corresponding to a pre-equalization equalizer tap value at a respective frequency.

17. The test device of claim 16, the processor further performs:
    determining peaks within the pre-equalization tap data by:
        comparing the pre-equalization tap data to a predetermined threshold; and
        identifying a peak when the pre-equalization tap data exceeds the predetermined threshold.

18. The test device of claim 16, wherein the processor further performs:
    determining peaks within the pre-equalization tap data by:
        comparing the pre-equalization tap data to a predetermined threshold;
        identifying a peak when the pre-equalization tap data exceeds the predetermined threshold;
        identifying a main tap as a tap with a largest peak; and
        normalizing the data such that the main tap is at a zero distance.

19. The test device of claim 18, the processor further performs removing harmonics from the pre-equalization tap data.

20. The test device of claim 11, wherein the pre-equalization tap analysis process performed by the processor further comprises correlating and grouping the plurality of modems within the network.

* * * * *